April 28, 1964  C. R. STEVENS  3,131,333
PULSE ELIMINATION CIRCUIT
Filed June 10, 1960
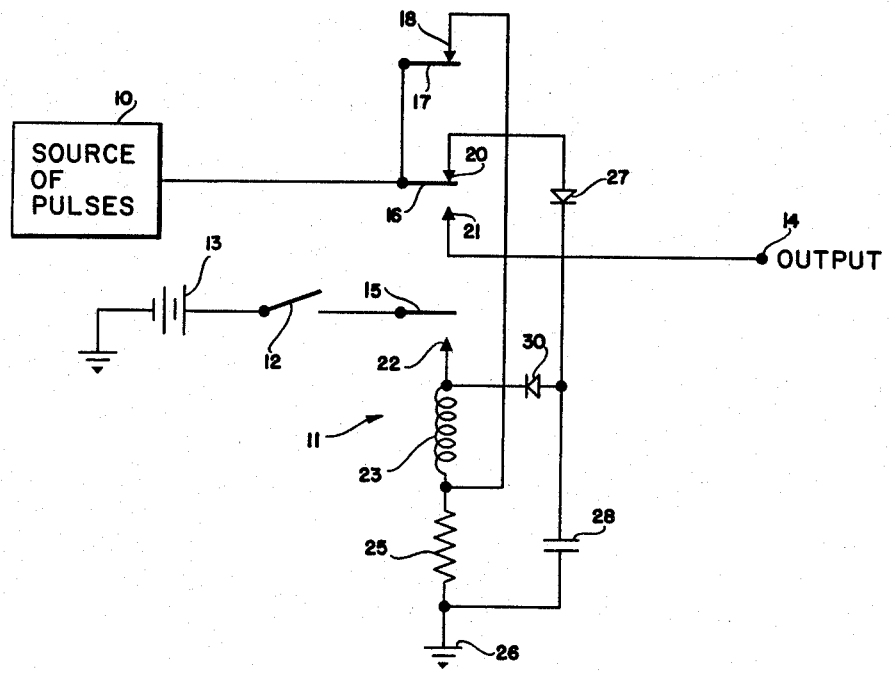
INVENTOR.
CARLILE R. STEVENS
BY
ATTORNEY United States Patent Office 3,131,333
Patented Apr. 28, 1964

3,131,333
PULSE ELIMINATION CIRCUIT
Carlile R. Stevens, Inglewood, Calif.
(272 Fairway, Danville, Calif.)
Filed June 10, 1960, Ser. No. 35,186
2 Claims. (Cl. 317—141)

This invention relates to control circuitry and in particular, to an electrical circuit for eliminating one or more pulses from a pulse train.

In electronic control applications, it is sometimes desirable to permit a predetermined number of pulses to pass from a pulse source to other circuitry. However, for control or other purposes, it is sometimes desirable to eliminate one or more pulses from the train at prescribed intervals. The present invention provides a novel circuit for eliminating one or more pulses from a pulse train which is simple and economical. Furthermore, the circuit of the present invention is extremely reliable since it is positive in operation and in application.

Therefore, it is a primary object of the present invention to provide a novel electronic circuit for eliminating one or more pulses from a pulse train while permitting the remainder of the continuous pulses in the train to be passed.

It is another object of the present invention to provide a novel circuit for selectively eliminating a single pulse from a pulse train without prohibiting or interfering with the following pulses.

Still a further object of the present invention is to provide a simple and reliable electronic circuit which may be easily connectible between a source of pulses and other circuitry for the purpose of eliminating one or more pulses from a given pulse train regardless of the pulse shape or duration.

Other objects of the invention and the various advantages and characteristics of the present circuit will be apparent from a consideration of the following detailed description when taken in connection with the accompanying drawing of a typical embodiment of the present invention in which like numbers of reference denote corresponding parts throughout the circuit diagram thereof.

With reference to the drawing, the present invention is shown which comprises, in general, a source of pulses 10 which may be any conventional pulse source for initiating pulse trains of either the spiked type or of the square wave variety, a relay 11 coupled to the source of pulses for pulse elimination and a switch 12 connected between the relay and a suitable source of potential 13 for selecting pulses in the pulse train to be passed through an output terminal 14.

Associated with relay 11, there is provided movable contact arms 15, 16 and 17 which operate in conjunction with and relative to stationary contacts. For example, movable contact arm 17 is detachably connectable with contact 18, movable contact arms 16 is selectively connectable with contacts 20 and 21 while movable arm 15 is associated with stationary contact 22. The movable arms of the relay are actuated when a suitable direct current coil 23 is energized. As shown in the accompanying drawing, the movable contacts are shown in their normally closed condition, i.e., when the relay is not energized.

It is to be noted in the circuit hookup, that the source of pulses is directly coupled to movable arms 16 and 17 of relay 11 and that stationary contact 18 is coupled to one end of D.C. coil 23. Also, it is noted that stationary contact 21 is directly coupled to output terminal 14 while movable arm 15 is coupled directly to one side of switch 12. It is to be understood that although switch 12 is shown symbolically as a manual switch, the switch may be replaced with additional electronic circuitry which would perform an identical function. Stationary contact 22 is coupled to the end of coil 23 opposite to that end of the coil coupled to stationary contact 18. Coil 23 is connected to a ground 26 via a resistor 25 which functions as a load to ground 26. Stationary contact 20 is coupled between ground 26 and resistor 25 via a diode semi-conductor 27 and a capacitor 28. Between diode 27 and capacitor 28, a second diode 30 is coupled to the coil 23 and stationary contact 22.

In actual operation, the source of pulses 10 initiates a pulse train of either spike shape or square wave to movable contact arms 16 and 17. The first pulse, which for purposes of illustration has been arbitrarily chosen to be eliminated from the train, progresses to ground 26 and one side of capacitor 28 via stationary contact 18 and load resistor 25. Simultaneously, the first pulse will travel to the opposite side of capacitor 28 via diode 27 and stationary contact 20. This arrangement insures that the first pulse will not energize coil 23 and commences the charging of capacitor 28. The capacitor will charge as the pulse is applied thereto until the peak of the pulse has fully charged the capacitor. After the pulse has terminated so that its bucking potential is no longer applied through contact 18 to the capacitor's discharge current path including coil 23, discharge current from capacitor 28 will flow through resistor 25, coil 23 and diode 30. The reverse resistance of diode 27 prevents capacitor discharge current from interfering with the source of pulses 10. The capacitor discharge current through coil 23 energizes the relay to move the relay contact arms 15, 16 and 17 from their normally closed position as shown in the drawing into positions where arm 15 engages stationary contact 22 and arm 16 connects with stationary arm 21. Arm 17 disconnects with contact 18 and remains open.

The pulse train following the first pulse will travel unimpeded to the output terminal 14 via stationary contact 21. As long as the coil 23 remains energized, arms 15, 16 and 17 will remain in these latter positions and these pulses will continue to travel.

To maintain coil 23 of the relay energized, switch 12 may be actuated so that current from source of potential 13 may be applied to the coil. Coil 23 will remain energized as long as switch 12 is closed. When it is desired to eliminate another pulse from the train, switch 12 may be opened by a suitable circuit (not shown) so that the movable contacts 15, 16, and 17 will move into their normally closed position when the coil of the relay is de-energized. The pulse to be eliminated will be applied across resistor 25 by contact 18 and passed by diode 27 via contact 20 to charge capacitor 28. As capacitor 28 discharges, coil 23 of the relay becomes energized moving the movable contacts into alternate positions to permit the following pulses from the source of pulses to continue to output terminal 14 via stationary contact 21 and a continued source of current is applied to the coil via stationary contact 22 when switch 12 is closed. To prevent capacitor 28 from charging during the continued operation of coil 23 diode 30 has been inserted so that its back resistance blocks the passage of current to capacitor 28.

Thereby, it is seen that the present invention provides a simple and economical circuit for selectively eliminating pulses from a pulse train regardless of pulse shape or pulse duration. The circuit is positive in its action and represents many safeguards against inadvertent actuation. Furthermore, the circuit concept is flexible enough in application for convenient coupling with other control circuitry in systems applications.

Various modifications may suggest themselves to those skilled in the art without departing from the spirit of my invention, and hence, I do not wish to be restricted

I claim:
1. A control circuit for eliminating at least one pulse from a series of pulses, comprising:
a source of pulses initiated in series;
output means for receiving said pulses;
switch means for alternately coupling and uncoupling said source of pulses with said output means and being in normally uncoupling condition;
a switch energization circuit means having first and second ends;
a resistor connected between said first end and a common reference potential point, said first end also being normally coupled to said source of pulses by said switch means;
a capacitor and a first diode in series, said capacitor being connected to said common reference potential point, and said first diode being normally coupled to said source of pulses by said switch means, said first diode being poled in a direction to pass said pulses to said capacitor for charging thereof;
a second diode connected between said second end of said switch energization circuit means and a junction between said capacitor and said first diode, said second diode being poled in a direction opposite to the polarity of the pulses coupled to said first end to prevent current through said switch energization circuit means during the occurrence of a first one of said pulses and, upon termination of such first one pulse, said capacitor will discharge through said second diode and said switch energization circuit means for causing said switch means to change to its alternate condition; and
a holding circuit including a source of direct current potential and having normally open contacts closed by said switch energization circuit means upon energization thereof for applying said direct current potential to said switch energization means to permit more than one pulse to be eliminated from the series.

2. A control circuit for eliminating at least one pulse from a series of pulses, comprising:
a source of pulses initiated in series;
output means for receiving said pulses;
a relay having a plurality of stationary contacts and movable contact arms with alternate positions and a coil with first and second ends;
a resistor connected between said first end and a common reference potential point, said first end also being normally coupled to said source of pulses by first ones of said stationary contacts and movable contact arms;
a capacitor and a first diode in series, said capacitor being connected to said common reference potential point, and said first diode being normally coupled to said source of pulses by second ones of said stationary contacts and movable contact arms, said first diode being poled in a direction to pass said pulses to said capacitor for charging thereof;
a second diode connected between said second end of said coil and a junction between said capacitor and said first diode, said second diode being poled in a direction opposite to the polarity of the pulses coupled to said first end to prevent current through said coil during the occurrence of a first one of said pulses and, upon termination of such first one pulse, said capacitor will discharge through said second diode and said coil for causing said movable contact arms to move to their alternate positions;
said output means being connected to a third one of said stationary contacts, said second movable contact arm making contact therewith in such alternate position for coupling said source of pulses to said output means; and
a holding circuit including a source of direct current potential and a fourth normally open pair of said stationary contacts and movable contact arms, one of which is connected to said second end of said coil, such pair being closed by energization of said coil for applying said direct current potential to said coil to permit more than one pulse to be eliminated from the series.

References Cited in the file of this patent
UNITED STATES PATENTS

| | | |
|---|---|---|
| 2,635,197 | Routledge | Apr. 14, 1953 |
| 2,910,231 | Hechler | Oct. 27, 1959 |
| 2,926,289 | Taugner | Feb. 23, 1960 |
| 2,939,054 | Caruso et al. | May 31, 1960 |